US 6,736,023 B1

(12) United States Patent
Sumi et al.

(10) Patent No.: US 6,736,023 B1
(45) Date of Patent: May 18, 2004

(54) TORQUE TRANSMITTING DEVICE

(75) Inventors: Hiromi Sumi, Saitama (JP); Toru Iizuka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/496,424

(22) Filed: Feb. 2, 2000

(30) Foreign Application Priority Data

Feb. 2, 1999 (JP) .......................................... 11-025126

(51) Int. Cl.$^7$ .............................. F02B 75/22; F16H 1/00
(52) U.S. Cl. ...................... 74/440; 74/595; 403/359.1; 403/359.6
(58) Field of Search .................... 403/359.2, 359.5, 403/359.6, 359.1; 74/254, 443, 440, 595; 123/55.5, 55.7

(56) References Cited

U.S. PATENT DOCUMENTS

| | | | | |
|---|---|---|---|---|
| 1,790,737 A | * | 2/1931 | Alborn .................. | 403/254 |
| 1,905,277 A | * | 4/1933 | Ewert .................... | 403/359.2 |
| 2,069,411 A | * | 2/1937 | Keese .................... | 74/424 |
| 2,228,770 A | * | 1/1941 | Tourneau ............... | 403/359.6 |
| 3,622,185 A | * | 11/1971 | Rosan et al. ........... | 403/316 |
| 4,135,766 A | * | 1/1979 | Trautloff ................ | 301/114 |
| 4,834,219 A | * | 5/1989 | Inagaki et al. ......... | 184/6.5 |
| 5,199,395 A | * | 4/1993 | Mizumura et al. ..... | 123/196 AB |
| 5,253,417 A | * | 10/1993 | Johnson ................. | 29/888.08 |
| 5,356,236 A | * | 10/1994 | Duboué ................. | 403/359.6 |

FOREIGN PATENT DOCUMENTS

| | | |
|---|---|---|
| DE | 4019119 A1 | 1/1992 |
| DE | 4240131 A1 | 6/1994 |
| DE | 19517258 A1 | 11/1996 |
| DE | 19523584 A1 | 1/1997 |
| EP | 359659 A1 | 3/1990 |
| JP | 2-32445 B2 | 9/1981 |
| JP | 57-101125 | * 6/1982 |
| JP | 2-62410 | * 3/1990 |
| JP | 5-85460 | * 4/1993 |
| JP | 9-280048 | * 10/1997 |

OTHER PUBLICATIONS

Marks' Standard Handbook for Mechanical Engineers, tenth edition, McGraw–Hill, 1996, ISBN 0–07–004997–1, pp. 8–43 and 13–63.*

* cited by examiner

Primary Examiner—William C. Joyce
(74) Attorney, Agent, or Firm—Birch, Stewart, Kolasch & Birch, LLP

(57) ABSTRACT

A torque transmitting device having a rotating shaft and a gear connected to the shaft. The gear transmits the torque between the rotating shaft and the gear. A splined portion and a centering inner circumferential surface portion formed in the inner periphery of the gear are engaged with the splined portion and the centering outer circumferential surface portion formed on the outer periphery of the rotating shaft. This arrangement minimizes noise due to gear runout, and reduces wear in the gear.

18 Claims, 2 Drawing Sheets

TORQUE TRANSMITTING DEVICE

BACKGROUND OF THE INVENTION

1. Field of the Invention

This invention relates to a torque transmitting device having a crankshaft connected to an internal combustion engine, and a gear connected with the rotating shaft to transmit a torque from the rotating shaft.

2. Background Art

A torque transmitting device having a rotating shaft and a gear connected with the rotating shaft to transmit a torque from the rotating shaft is known, as shown in Japanese Examined Patent Publication No. Hei 2-32445.

The prior art torque transmitting device mentioned above is provided with a crankshaft for an internal combustion engine, a camshaft-driving timing gear and a primary drive gear which are connected with the crankshaft to transmit a torque from the crankshaft, and which function as gears for transmitting the torque from the crankshaft to a camshaft and a clutch.

In the torque transmitting device, the cam-driving timing gear and primary drive gear are connected with the crankshaft by inserting a key into a keyway formed in the outer periphery of the crankshaft and in the inner periphery of these two gears.

In such a gear connection using the key as stated above, each of the gears needs centering with respect to the crankshaft, at both the outer periphery of the crankshaft and the inner periphery of each gear except the keyway. This prevents gear runout resulting from misalignment of the axis of the gears with the axis of the crankshaft. However, a member for transmitting the torque from the crankshaft to each gear is mounted by a single key, and the torque transmitting surface of the key is likely to be worn. In the event of wear in this portion, it becomes difficult to transmit a specific amount of torque.

In view of the above-described problems inherent in conventional devices, it is an object of the present invention to provide a torque transmitting device which enables the centering of the gears connected to the rotating shaft, and is subject to decreased wear of the torque transmitting surface.

A further object is to facilitate a fitting operation and accurate centering.

Another object is to enable more accurate setting of the intake and exhaust valves of an internal combustion engine, and to enable transmission of a greater driving torque in the internal combustion engine.

SUMMARY OF THE INVENTION

The torque transmitting device according to this invention has a rotating shaft and a gear connected with the rotating shaft to transmit the torque from the rotating shaft. In this torque transmitting device, the splined portion and the inner circumferential surface portion for centering formed in the inner periphery of the gear are fitted on the splined portion and the outer circumferential surface portion for centering formed in the outer periphery of the rotating shaft.

According to the invention, the outer peripheral surface for centering of the rotating shaft and the inner circumferential surface portion for centering of the gears are mutually fitted to allow accurate centering of the gears with respect to the rotating shaft, thereby preventing gear runout on the rotating shaft. This minimizes noise resulting from the gear runout.

In addition, because the splined portion of the gear is mounted on the splined portion of the rotating shaft to thereby transmit the torque from the rotating shaft to the gear through a plurality of splines, it is possible to reduce wear of the torque transmitting surface. Consequently, it is possible to transmit a great torque and to transmit a desired amount of torque for a prolonged period of time.

The outer circumferential surface portion for centering and the inner circumferential surface portion for centering may be clearance-fit, which enables easy mounting of a gear on the rotating shaft.

The outside diameter of the outer circumferential surface portion for centering may be larger than the outside diameter of the splined portion formed on the rotating shaft. Because of the larger outside diameter of the outer circumferential surface portion, the outer circumferential surface portion for centering and the inner circumferential surface portion for centering can be fitted without being affected by the fitting of the splined portion, which enables accurate centering. The rotating shaft is a crankshaft of the internal combustion engine and the gear is a cam-driving timing gear of the internal combustion engine, and therefore the crankshaft of the internal combustion engine and the cam-driving timing gear are accurately centered. It is thus possible to accurately set the valve timing of the intake and exhaust valves driven by the rotation of the camshaft.

The rotating shaft may be the crankshaft of the internal combustion engine, and the gear may be a primary drive gear of the internal combustion engine. Because the torque transmission is effected between the crankshaft and the primary drive gear through the splined portion, a great deal of driving torque can be transmitted from the crankshaft to the clutch even in an internal combustion engine having a large displacement and a high-speed internal combustion engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus not limitative of the present invention, and wherein.

DETAILED DESCRIPTION OF THE PREFERRED EMBODIMENTS

Figure 1:
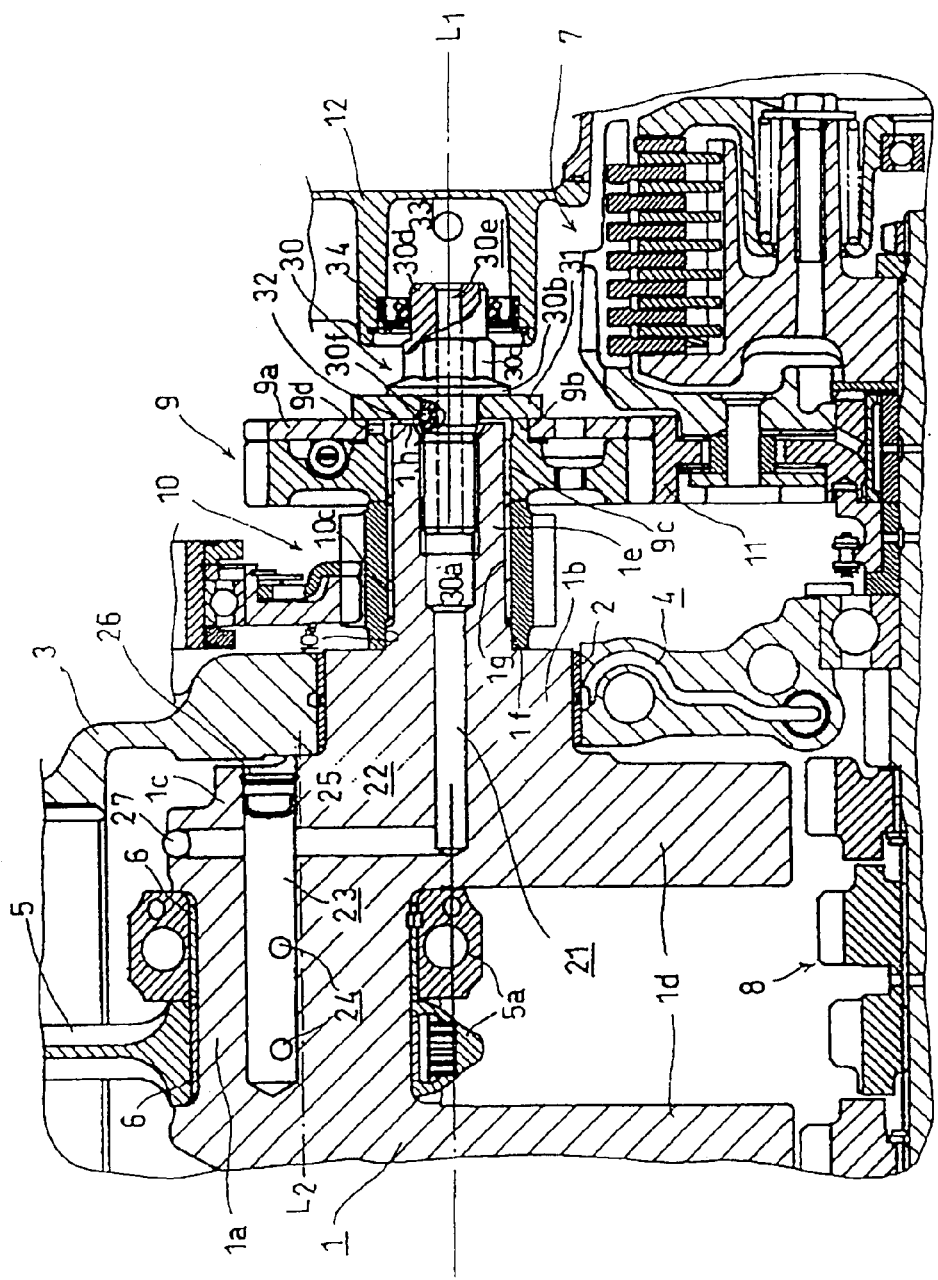
FIG. 1 is a sectional view of a crankshaft and a crankcase of a torque transmitting device according to a first embodiment of the present invention.

In the first embodiment of the invention shown in FIG. 1, a crankshaft lubricating oil passage has been applied to a crankshaft 1 of an overhead camshaft type V-2 internal combustion engine mounted on a motor vehicle such as a motorcycle. The crankshaft 1 is supported on two right and left bearings 2 (only the right-hand bearing 2 is depicted) which are main bearings mounted in a crankcase 3 which is split into an upper half and a lower half. In the bearing 2 support section of the crankcase 3 is formed a passage 4 through which lubricating oil is supplied to the bearing 2.

The crankshaft 1 includes a crankpin 1a, a crankshaft journal 1b, a crank arm 1c, and a balance weight 1d, which are molded in one body. On the crankpin 1a is adjacently mounted a big end 5a of each connecting rod 5 whose small end is connected with a piston pin installed in a piston in each engine cylinder. The big end 5a of each connecting rod 5 is slidably fitted on the outer periphery of the crankpin 1a on which the connecting rod 5 is installed through a bearing 6 which is fixedly installed on the inner periphery of the big end 5a. Between the bearing 6 and the connecting surface lubricating oil is supplied to reduce sliding resistance therebetween.

The reciprocating motion of the piston which is transmitted through the connecting rod 5 is changed into a rotating motion. The torque of the crankshaft 1 is then transmitted to the rear wheel through a multiple-disk friction clutch 7, a constant mesh transmission 8, and drive chain. Torque transmission from the crankshaft 1 to the multiple disk friction clutch 7 is effected by a primary reduction mechanism which includes a primary drive gear 9 splined to the shaft end portion 1e of the crankshaft 1, and a primary driven gear 11 which is in mesh with the primary drive gear 9 and connected via a damper to the clutch housing of the multiple-disk friction clutch 7.

The primary drive gear 9 has a primary sub gear 9a connected to the primary drive gear 9 through an elastic member or spring in order to eliminate a backlash between the primary drive gear 9 and the primary driven gear 11. The primary sub gear 9a is fitted on the outer periphery of a boss portion 9b on a thrust washer 31 side of the primary drive gear 9. The end face of the primary sub gear 9a and the end face of the boss portion 9b are capable of contacting the thrust washer 31.

The shaft end portion 1e of the crankshaft 1 is comprised of a portion of the crankshaft 1 extending towards a right cover 12 of the crankcase from the right crankshaft journal 1b. The outer periphery of the shaft end portion 1e is disposed near the crankshaft journal 1b and includes the outer circumferential surface portion 1f having a smooth circumferential surface portion and a splined portion 1g. The splined portion 1g of the shaft includes a plurality of spline grooves and a plurality of spline teeth formed in parallel with the axial line L1 of the crankshaft in a small-diameter portion which extends from the crankshaft journal 1b towards the end face 1h of the shaft end portion 1e, and has a smaller outside diameter than the outside diameter of the outer circumferential surface portion 1f. The outside diameter of the outer circumferential surface portion 1f is larger than the outside diameter of the spline teeth of the splined portion 1g.

On the outer periphery of the shaft end portion 1e are mounted, in the following order, from the right crankshaft journal 1b side, a camshaft-driving timing gear 10 and the primary drive gear 9 which are provided, in their inner periphery, with splined portions 10c and 9c having a plurality of spline teeth and a plurality of spline grooves which are engaged with the spline grooves and spline teeth of the shaft end portion 1e. The gears 9 and 10, thus splined, are stationary in the direction of rotation of the crankshaft 1, but are rotatable as one body with the crankshaft 1.

The gears 9 and 10 are locked, by a crankshaft center bolt 30 mounted on the shaft end portion 1e, from moving in the direction of the axial line L1 of the crankshaft. Either of these gears 9 and 10 serves as a torque transmitting member for transmitting the torque from the crankshaft 1 to the camshaft or the clutch.

On the inner periphery of the timing gear 10 near the right crankshaft journal 1b, there is formed an inner circumferential surface portion 10a having a smooth surface which fits on the outer circumferential surface portion 1f formed on the shaft end portion 1e, thereby insuring clearance fitting of the outer circumferential surface portion 1f with the inner circumferential surface portion 10a, and accurate centering of the timing gear 10 with respect to the crankshaft 1. The outer circumferential surface portion 1f and the inner circumferential surface portion 10a are polished to enable more accurate centering. By thus centering the timing gear 10, it becomes possible to prevent the runout of the timing gear 10 in relation to the crankshaft 1, and accordingly to minimize noise resulting from the gear runout. Concurrently, the rotation of the timing gear 10 is transmitted to the camshaft mounted in the cylinder head through a series of gears, thus driving the intake valve and the exhaust valve by the rotation of the camshaft.

Next, the lubricating oil passage will be explained. A bottomed, stepped hole 21 is formed by drilling from the end face 1h of the shaft end portion 1e towards a crank arm 1c. This hole 21 has small—and large-diameter portions and a centerline which is coaxial with the axis L1 of the crankshaft 1. The small-diameter portion of the stepped hole 21 is disposed near the crank arm 1c (near the bottom) of the stepped hole 21, while the large-diameter portion of the stepped hole 21 is located near the end face 1h (near the open end) of the shaft end portion 1e. Near the open end of the peripheral wall of the large-diameter portion, a female screw is cut.

A crankshaft center bolt 30 is engaged with the female screw. The stepped hole 21 serves as a first lubricating oil passage 21 for supplying the lubricating oil to the connecting surface of the crankpin 1a.

The crankpin 1a is provided with a bottomed hole 23 having a centerline parallel with the axial line L2 of the crankpin. The hole 23 is formed by drilling from the right side face of the right crank arm 1c towards the crankpin 1a. The centerline is present on a plane inclusive of the axis L2 of the crankpin and the axis LI of the crankshaft L1, and is on the opposite side of the axis L1 of the crankshaft in relation to the axis L2 of the crankpin. The diameter of the hole 23 is larger than the diameter of the small-diameter portion of the stepped hole 21, which therefore functions to hold the lubricating oil that has flowed therein, to thereby enable a stable supply of lubricating oil to the connecting surface of the crankpin 1a via a fourth lubricating oil passage 24.

The hole 23 is closed with a cup-shaped member 25 which is a seal plug, near the open end beyond a point intersecting a second lubricating oil passage 22. The hole 23 thus formed functions as a third lubricating oil passage 23 for supplying lubricating oil to the connecting surface of the crankpin 1a.

The passage portion of the third lubricating oil passage 23 which is located close to the open end beyond the cup-shaped member 25 has a larger diameter than other passage portion of the third lubricating oil passage 23. An annular groove is formed in the peripheral wall in which a clip 26 is installed by its elastic force. The clip 26 serves to prevent accidental removal of the cup-shaped member 25 from the third lubricating oil passage 23.

The hole 22 is formed by drilling from the outer periphery near the crankpin 1a of the crank arm 1c, extending towards the balance weight 1d from the outer periphery near the crankpin 1a of the crank arm 1c through the third lubricating oil passage 23, until it reaches the innermost part of the first lubricating oil passage 21 (the bottom of the small-diameter portion of the stepped hole 21). The hole 22 has a centerline orthogonal to the centerline of either of the first and the third lubricating oil passages 21 and 23, and has nearly the same diameter as the diameter of the small-diameter portion of the stepped hole 21.

The hole 22 is also closed with a ball member 27 as a seal plug near the open end far from the portion intersecting the third lubricating oil passage 23. The hole 22 thus formed serves as the second lubricating oil passage 22 for supplying the lubricating oil to the connecting surface of the crankpin 1a.

A couple of hole s 24 open into the third lubricating oil passage 23 and are formed by drilling from the connecting surface of the crankpin 1a, in a part corresponding to the big end 5a of the connecting rod 5. These holes 24 serve as the fourth lubricating oil passage 24 for supplying the lubricating oil to the connecting surface. The lubricating oil flowing out of the fourth lubricating oil passage 24 is supplied between the bearing 6 of the big end 5a of the connecting rod 5 and the connecting surface.

The first to the fourth lubricating oil passages 21, 22, 23 and 24 create lubricating oil passages formed in the crankshaft 1. A portion of the first lubricating oil passage 21 which is adjacent to the end face of the shank portion 30a of the crankshaft center bolt 30 corresponds to the inlet port end, while the open end on the connecting surface side of the fourth lubricating oil passage 24 corresponds to the outlet port end of the lubricating oil passage.

The crankshaft center bolt 30 is mounted on the shaft end portion 1e of the crankshaft 1, with the male screw formed on the shank portion 30a of the crankshaft center bolt 30 engaged with the female screw formed in the large-diameter portion of the stepped hole 21. The head of the crankshaft center bolt 30 has a hexagonal column portion 30c with a flange 30b formed adjacent to the shank portion 30a, and a round column portion 30d extending axially from the hexagonal column portion 30c. On the outer periphery of the round column portion 30d, the lip portion of an oil seal 34 slides. The outer periphery is polished to insure smooth sliding of the lip portion.

The crankshaft center bolt 30 has a through hole 30e having a centerline coaxial with the axis of the crankshaft center bolt 30 and accordingly with the axis L1 of the crankshaft. The through hole 30e thus formed serves as a lubricating oil passage 30e connected to the inlet port end of the lubricating oil passage formed in the crankshaft 1.

The crankshaft center bolt 30, with a thrust washer 31 inserted thereon, is screwed into the female screw by using a tool on the hexagonal column portion 30c. As the crankshaft center bolt 30 is tightened, the end face of the timing gear 10 on the crankshaft journal 1b side contacts the end face of the crankshaft journal 1b, and accordingly the end face of the timing gear 10 on the primary drive gear 9 side and the end face of the primary drive gear 9 on the timing gear 10 side mutually contact. Therefore, the end face of the primary drive gear 9 on the thrust washer 31 side and the end face of the boss portion 9b on the thrust washer 31 side contact the thrust washer 31, thereby checking the timing gear 10 and the primary drive gear 9 mounted on the shaft end portion 1e from moving in the direction of the axis L1 of the crankshaft.

In the crankshaft center bolt 30, a pulling force occurs at the shank portion 30a between the male screw and the flange 30b when the crankshaft center bolt 30 is tightened. This portion is subject to slight elongation within the elasticity zone. Therefore, the elastic force caused by this elongation acts on the female screw on the large-diameter portion of the stepped hole 21 and on the male screw of the crankshaft center bolt 30 which is in engagement with the female screw, thus preventing the bolt 30 from loosening. The bolt 30 will not easily loosen, and consequently the timing gear 10 and the primary drive gear 9 can be reliably locked from moving in the direction of the axis L1 of the crankshaft.

In the state in which both gears 9 and 10 are secured by the crankshaft center bolt 30, a very small clearance 32 exists between the end face 1h of the shaft end portion 1e of the crankshaft 1 and the thrust washer 31. In the vicinity of the portion of the shank portion 30a of the crankshaft center bolt 30 where the thrust washer 31 is inserted, a first oil hole 30f which is open into the lubricating oil passage 30e is formed orthogonal to the centerline of the lubricating oil inlet passage 30e and into the clearance 32.

A second oil hole 9d is formed radially through the fitting section of the boss portion 9b, so that the lubricating oil may be supplied through the clearance 32 to the fitting section between the inner periphery of the primary sub gear 9a and the outer periphery of the boss portion 9b of the primary drive gear 9. Therefore, a part of the lubricating oil flowing in the lubricating oil inlet passage 30e flows through the clearance 32 from the first oil hole 30f into the second oil hole 9d, then being supplied further into the fitting section between the primary sub gear 9a and the boss portion of the primary drive gear 9. Lubrication to the fitting section can be effected through a simple passage formation.

The crankshaft center bolt 30, as stated above, functions as a fastening member for securing the timing gear 10 and the primary drive gear 9 which are torque transmitting members, and also as a lubricating oil inlet member to introduce the lubricating oil into the lubricating oil passage.

Inside of the right cover 12 of the crankcase is formed a lubricating oil chamber 33 consisting of a recessed section. The lubricating oil chamber 33 is located, opening towards the crankshaft 1, on the axis L1 of the crankshaft and accordingly on the centerline of the lubricating oil inlet passage 30e formed in the crankshaft center bolt 30 when the right cover 12 is attached to the crankcase 3, and the round column portion 30d of the head of the crankshaft center bolt 30 projects into the lubricating oil chamber 33. Consequently, lubrication can be accomplished without changing the crankshaft 1, even when the clearance between the end face 1h of the shaft end portion 1e of the crankshaft 1 and the lubricating oil chamber 33 varies with the engine model, by preparing a plurality of types of crankshaft center bolts 30 which differ in the length of the round column portion 30d.

The oil seal 34 is fixedly mounted at the opening end portion of the lubricating oil chamber 33 and its lip portion slides on the polished part of the outer periphery of the round column portion 30d projecting into the lubricating oil chamber 33. Liquid tightness between the open end portion of the lubricating oil chamber 33 and the round column portion 30d, therefore, is kept to thereby prevent lubricating oil leakage from the lubricating oil chamber 33 at the outer periphery of the round column portion 30d.

Next, the flow of the lubricating oil in the present embodiment will be explained. The lubricating oil supplied under an increased pressure from the oil pump flows through a filter and a passage formed in the right cover 12, being supplied into the lubricating oil chamber 33 formed in the crankcase right cover 12, in which the lubricating oil is reserved. Then, the lubricating oil in the lubricating oil chamber 33 flows through the lubricating oil inlet passage 30e formed in the crankshaft center bolt 30 into the first lubricating oil passage 21 formed in the crankshaft 1, from which the lubricating oil is discharged to the connecting surface of the crankpin 1a through the second, third and fourth lubricating oil passages 24, then being supplied to the bearing 6 at the big end portion 5a of the connecting rod 5 which is a sliding part, and to the crankpin 1a.

A part of the lubricating oil that has entered the lubricating oil inlet passage 30e flows through the first oil hole 30f, the clearance 32 and the second oil hole 9d, being supplied to the fitting section between the primary sub gear 9a and the boss portion 9b of the primary drive gear 9.

This embodiment of the invention conveys the following advantages The timing gear 10 is properly centered in relation to the crankshaft 1 by fitting the outer circumferential surface portion 1f in the inner circumferential surface portion 10a, preventing the runout of the timing gear 10 with respect to the crankshaft 1 and minimizing noise occurring with gear runout. Furthermore, the outer circumferential surface portion 1f is clearance-fit in the inner circumferential surface portion 10a, so the gear fitting operation can easily be performed.

Since the outer circumferential surface portion 1f has a larger outside diameter than the splined portion 1g of the crankshaft 1, the outer circumferential surface portion 1f can be fitted and properly centered with the inner circumferential surface portion 10a without any effect of fitting of the splined portion 1g.

The timing gear 10 is properly centered with respect to the crankshaft 1, and therefore it is possible to properly set the valve timings of the intake and exhaust valves which are driven by the rotation of the camshaft.

Since the splined portion 10c of the timing gear 10 is engaged with the splined portion 1g of the crankshaft 1, the torque of the crankshaft 1 is transmitted to the timing gear 10 through a plurality of splines, thereby decreasing wear of the torque transmitting surface. As a result, a great torque can be transmitted, and a desired amount of torque can be transmitted for a prolonged period of time.

Figure 2:
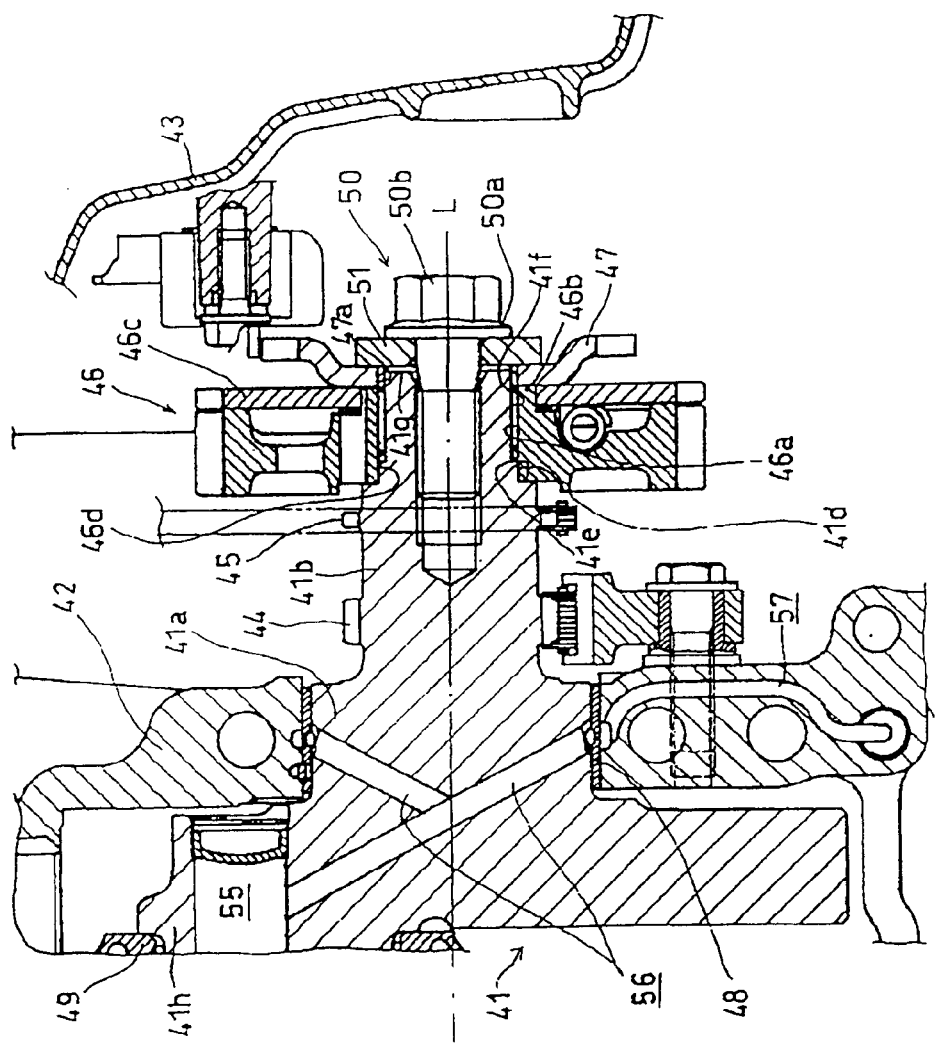
FIG. 2 is a sectional view of the crankshaft and the crankcase of a torque transmitting device according to a second embodiment of the present invention.

Next, referring to FIG. 2, the second embodiment of this invention will be explained. In the torque transmitting device shown in FIG. 2, a shaft end portion 41b of the crankshaft 41 is a portion extended from the right crankshaft journal 41a towards the right cover 3 of the crankcase. On the outer periphery of the shaft end portion 41b are formed a camshaft drive sprocket 44 and a sub drive sprocket 45. A primary drive gear 46 and the sub drive gear 47 are fitted on the outer periphery of the shaft end portion 41b also.

The primary drive gear 46 and the sub drive gear 47 are mounted on a fitting portion 41c of the shaft end portion 41b. The fitting portion 41c has a smaller outside diameter than the shaft end portion 41b on which both drive sprockets 44 and 45 are formed. Therefore, on the shaft end portion 41b is formed a stepped portion 41d. The fitting portion 41c has, in order, from the stepped portion 41d side, an outer circumferential surface portion 41e having a smooth circumferential surface and a splined portion 41f.

The splined portion 41f is formed on the small-diameter portion extending towards the end face 41g of the shaft end portion 41b from the outer circumferential surface portion 41e, and has a smaller outside diameter than the outer circumferential surface portion 41e. The splined portion 41f thus formed includes a plurality of spline grooves and a plurality of spline teeth formed in parallel with the axis L of the crankshaft. The outside diameter of the outer circumferential surface portion 41e is larger than the outside diameter of the spline teeth of the splined portion 41f.

On the outer periphery of the fitting portion 41c are mounted, in order, from the stepped portion 41d side, the primary drive gear 46 and the sub drive gear 47 which respectively have the splined portions 46a and 47a including a plurality of spline teeth and a plurality of spline grooves engaged with the spline grooves and spline teeth of the fitting portion 41c formed in the inner periphery. Therefore, both gears 46 and 47 are connected so as to be stationary in the direction of rotation of the crankshaft 41, and rotatable as one unit with the crankshaft 41.

The primary drive gear 46 has, as in the first embodiment, a primary sub gear 46c mounted on the outer periphery of a boss portion 46c on the sub drive gear 47 of the primary drive gear 46. The primary drive gear 46 and the sub drive gear 47 are checked from moving in the direction of the axis of the crankshaft by means of the crankshaft center bolt 50 threadedly engaged with the shaft end portion 41b.

The crankshaft center bolt 50 with a thrust washer 51 inserted thereon is inserted into a female screw formed in the shaft end portion 41b, by using a tool on the hexagonal column portion 50b of the flange 50a. As the crankshaft center bolt 50 is tightened, the end face on the stepped portion 41d side of the primary drive gear 46 contacts the stepped portion 41d, and accordingly the end face on the sub drive gear 47 side of the primary drive gear 46, the end face on the sub drive gear 47 side of the boss portion 46b, and the end face on the primary drive gear 46 side of the sub drive gear 47 mutually contact. In this state, the end face on the thrust washer 51 side of the sub drive gear 47 contacts the thrust washer 51, thereby checking the primary drive gear 46 and the sub drive gear 47 from moving in the direction of the axis L of the crankshaft.

Near the stepped portion 41d in the inner periphery of the primary drive gear 46, there is formed an inner circumferential surface portion 46d having a smooth circumferential surface which fits the outer circumferential surface portion 41e formed on the fitting portion 41c. The outer circumferential surface portion 41e, and the inner circumferential surface portion 46d are fitted by a clearance-fit, so that the primary drive gear 46 can be accurately centered in relation to the crankshaft 41.

The outer circumferential surface portion 41e and the inner circumferential surface portion 46d are polished to thereby enable more accurate centering, whereby the runout of the primary drive gear 46 in relation to the crankshaft 41 is checked, accordingly minimizing noise accompanying gear runout.

The primary drive gear 46, as in the first embodiment, is in mesh with the primary driven gear in the clutch housing of the multiple-disk friction clutch, so that the torque of the crankshaft 41 will be transmitted to the rear wheel through the multiple-disk friction clutch, the constant-mesh transmission, and a drive chain.

Two lubricating oil passages 56 are formed in the crankshaft 41 by drilling from the peripheral surface of the crankshaft journal 41a, and are connected to the lubricating oil passage 55 formed in the crankpin 41h. The lubricating oil supplied through the bearing 48 from the lubricating oil passage 57 formed in the supporting part of the bearing 48 mounted on the crankcase 42, therefore, is supplied into the lubricating oil passage 55 of the crankpin 41h. As in the first embodiment, lubricating oil is fed through a hole in the crankpin 41h which is open to the connecting surface of the connecting rod 49.

Therefore, according to the second embodiment of the invention, since the outer circumferential surface portion 41e and the inner circumferential surface portion 46d fit together, the primary drive gear 46 can be properly centered in relation to the crankshaft 41 just as in the first embodiment. Furthermore, because of the fitting between the splined portion 42f of the crankshaft 41 and the splined portion 46a of the primary drive gear 46, the torque of the crankshaft 41 is transmitted to the primary drive gear 46 through a plurality of splines, reducing wear of the torque transmitting surface. Consequently, it is possible to transmit a great torque, and also to transmit a desired amount of torque for a prolonged period of time. Because it is possible to transmit great torque, a great deal of driving torque can be transmitted from the crankshaft 41 to the clutch 7 even in an internal combustion engine having a large displacement, and in a high-speed internal combustion engine.

In the first and second embodiments, the gears are connected to the crankshaft which is a driving shaft, to thereby transmit the torque from the crankshaft to the gears. In this case, the gears may be connected to a rotating shaft which is a driven shaft to transmit the torque from the gears to the rotating shaft.

It is to be noticed that, in the first and second embodiments, the torque transmitting device of this invention has the crankshaft of an internal combustion engine and gears connected to the crankshaft, and may have other rotating shaft of the internal combustion engine and gears connected to the rotating shaft and furthermore a rotating shaft of other than the internal combustion engine and gears connected to the rotating shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque transmitting device, comprising:
    a rotatable shaft having two longitudinally extending portions on the shaft, including a splined portion arranged toward an end of the shaft and a non-splined outer circumferential surface portion;
    said non-splined outer circumferential surface portion having a larger outer diameter than said splined portion;
    a first gear assembly having two longitudinally arranged portions including a splined portion which is engaged with said splined portion of said rotatable shaft to transmit a torque, and a non-splined inner circumferential surface portion which is engaged with said non-splined outer circumferential surface portion;
    said non-splined outer circumferential surface portion engaged with said non-splined inner circumferential surface -portion with a clearance fit so as to facilitate the centering of said first gear assembly on said rotatable shaft;
    a second gear assembly driven by said first gear assembly;
    a third gear assembly driven by said first gear assembly;
    wherein said secondhand third gear assemblies are arranged over said splined portion of said first gear assembly.

2. The torque transmitting device of claim 1, wherein the inner circumferential surface portion of the gear assembly and the outer circumferential surface portion of the rotatable shaft are smooth polished surfaces to facilitate accurate centering.

3. The torque transmitting device of claim 1, wherein the inner circumferential surface portion of the gear assembly is proximate to the splined portion of the gear assembly along a longitudinal axis of the gear assembly.

4. The torque transmitting device of claim 1, wherein the splined portion of the gear assembly is located on an inner periphery of the gear assembly.

5. The torque transmitting device of claim 1, wherein said rotating shaft is a crankshaft of an internal combustion engine.

6. The torque transmitting device of claim 1, wherein the gear assembly includes at least one of a timing gear and a drive gear.

7. The torque transmitting device of claim 6, wherein the gear assembly includes the timing gear and the drive gear, the timing gear being mounted on the rotatable shaft adjacent to the drive gear.

8. The torque transmitting device of claim 7, wherein the splined portion of the gear assembly is located on an inner peripheral surface of the timing gear.

9. The torque transmitting device of claim 7, wherein the gear assembly includes a primary sub gear, the primary sub gear being mounted adjacent to the drive gear and prevented from axial movement with respect to the drive gear by a thrust washer engaging a face of the primary sub gear.

10. The torque transmitting device of claim 1, wherein the gear assembly includes at least one of a timing gear and a drive gear.

11. The torque transmitting device of claim 10, wherein the gear assembly includes the timing gear and the drive gear, the timing gear being mounted on the rotatable shaft adjacent to the drive gear, the splined portion of the gear assembly being disposed on an inner peripheral portion of the timing gear.

12. The torque transmitting device of claim 11, wherein the rotatable shaft includes an oil passageway, the oil passageway extending along an axial length of the shaft, and further extending substantially radially outwardly from a longitudinal axis of the shaft.

13. The torque transmitting device of claim 10, wherein the gear assembly includes:
    a primary sub gear, the primary sub gear being mounted on a portion of the drive gear; and
    a thrust washer supported on the rotatable shaft, the thrust washer abutting the primary sub gear and preventing axial motion of the primary sub gear with respect to the drive gear.

14. The torque transmitting device of claim 10, wherein an inner circumferential surface portion of the timing gear engages an outer circumferential surface portion of the rotatable shaft.

15. The torque transmitting device of claim 10, wherein the splined portion of the gear assembly is located on an inner peripheral surface of the drive gear, the drive gear further including an inner circumferential surface portion, the inner circumferential surface portion engaging an outer circumferential surface portion of the rotatable shaft.

16. The torque transmitting device of claim 15, wherein the outer circumferential surface portion of the rotatable shaft is proximate to the splined portion of the rotatable shaft, the outer circumferential surface portion and the inner circumferential surface portion of the drive gear having polished surfaces, an outside diameter of the outer circumferential surface portion of the rotatable shaft being larger than an outside diameter of the splined portion of the rotatable shaft.

17. The torque transmitting device of claim 15, wherein the gear assembly includes a primary sub gear mounted coaxially with the rotatable shaft and abutting the drive gear.

18. The torque transmitting device of claim 1, wherein said non-splined outer circumferential surface portion and said non-splined inner circumferential portion are precision cut for accurate centering.

* * * * *